Patented Jan. 24, 1933

1,894,947

UNITED STATES PATENT OFFICE

WERNER ESPE, OF BERLIN-CHARLOTTENBURG, GERMANY, ASSIGNOR TO SIEMENS & HALSKE AKTIENGESELLSCHAFT, OF SIEMENSSTADT NEAR BERLIN, GERMANY, A GERMAN COMPANY

MANUFACTURE OF VACUUM TUBES

No Drawing. Application filed August 14, 1930, Serial No. 475,401, and in Germany August 17, 1929.

The invention relates to the manufacture of vacuum tubes and particularly to a method for initiating or effecting chemical reactions by heating certain substances and substance mixtures in vacuum tubes. The reaction is to be initiated or effected in this way, that rays are concentrated on the means to be heated from the exterior. In the first place heat or light rays are employed. The method can be particularly employed to effect the reaction necessary for mirroring the tube walls or for coating the cathode with a metallic layer. The electrodes of a vacuum tube above all the anode must be subjected to heat treatment in order to remove gas residue therefrom or in order to form the cathode material so that it is capable of an electron emission. If the substance to be subjected to a reaction has such a low reaction temperature that during the heat treatment of the remaining parts it would suffer variations of any kind owing to the temperatures occurring thereby, screening is provided. If the electrodes are brought to the temperature for instance by high frequency which is necessary for degassing or formation, the substances whose reaction is to be initiated from the exterior by concentrated rays, are to be arranged in such a manner that they are not influenced by the leakage of the high frequency field.

In one method in accordance with this invention that a mixture of barium oxides and aluminium is applied to a small support inside the tube, which is removed from the effect of the high frequency field. The anode is firstly brought to the degassing temperature by the high frequency field and kept at this temperature for such time until the degassing is effected. Then for instance by a lens system the light of an arc lamp is concentrated on the reaction mixture and its reaction initiated. The same arrangement can be used if it is desired to form the cathode. In this manner the formation of the cathode and the degassing of the remaining electrodes can be separated from making a gas absorbing coating or applying a good emitting layer to the cathode, without substantial delay occurring in the operation.

If there is the possibility of using for the reactions effected from the exterior substances whose reaction temperature is higher than the temperature necessary for formation or degassing, the method can be simplified in this way, that the reaction mixture is applied directly for instance to the anode. These would then firstly have to be subjected to the temperature necessary for degassing. Thereupon light or heat rays from the exterior of the device are concentrated onto the reaction mixture so that its reaction is initiated without the support electrodes having to be heated to unpermissible high temperatures to initiate reaction.

The following is an example for the latter method:

A pressed pill of barium oxide and aluminium (approximately 10:1 parts by weight) is fixed to an anode which may be of nickel by means of a mesh grid and then the electrodes are heated by high frequency up to 900° C. and degassed. If now the reaction mixture is to be brought to ignition the nickel anode would have to be heated to about 1100° C. by increasing the high frequency energy. However, hereby the metal anode would distort and above all evaporate to such an extent that the insulation in the squash would be destroyed. In accordance with the invention one proceeds in this way, that the focal point of the light source is set to the reaction mixture, the anode being maintained glowing by high frequency at 900° C. to attain the remaining 200° C., or if the anode is cold to heat the anode to a temperature of 1100° C. necessary for reaction by means of a source of light for instance an arc lamp and a lens so that a point of the reaction mixture is raised to a temperature of 1200° C. and the reaction is initiated thereby. The barium available in the pill after the reaction can then by high frequency heating of the anode to 700° C. be overdistilled to the vaporization point of the barium to the other electrode for instance to the cathode.

What is claimed is:

1. In the manufacture of electron discharge devices comprising an enclosing vessel, a cathode and an anode within said vessel, and a reaction mixture carried by said anode, the method which comprises heating said anode and mixture by high frequency induced currents to a sufficient temperature to free occluded gases therefrom but insufficient to cause reaction in said mixture, supplementing the high frequency heating of said mixture by focussing a concentrated beam of light thereon in order to effect reaction in said mixture, and finally heating said anode to vaporize a product of the reaction.

2. In the manufacture of electron discharge devices comprising an enclosing vessel, a cathode and an anode within said vessel, and a mixture of barium oxide and aluminum on said anode, the method which comprises heating said anode and mixture to 900° C. to release occluded gases, maintaining said heating while focussing a beam of light solely on said mixture to raise the temperature thereof to approximately 1100° C. whereby reaction between said barium oxide and aluminum occurs to produce metallic barium, and distilling said barium by high frequency heating.

3. In the manufacture of electron discharge devices comprising and enclosing vessel, an electrode within said vessel and a reaction mixture including an alkaline earth metal upon a portion only of said electrode, the method which comprises heating said electrode by high frequency induction to a temperature below the reaction temperature of said mixture, whereby occluded gases are removed from said electrode, heating said mixture by a concentrated beam of light to initiate the reaction and to form free alkaline earth metal, and heating said electrode to completely vaporize said metal.

4. In the manufacture of electron discharge devices comprising an enclosing vessel, a cathode within said vessel, an anode adjacent said cathode, and a reaction mixture including an alkaline earth metal oxide and a reducing agent upon a portion of said anode, the method which comprises heating said cathode and anode by high frequency induction to a temperature below the ignition temperature of the mixture, whereby occluded gases are driven from said cathode and anode, heating said mixture by a beam of light focussed upon said portion of said anode to initiate the reaction of said mixture whereby free alkaline earth metal is formed adjacent said anode, and heating said anode to completely vaporize said metal.

In witness whereof, I hereunto subscribe my name this 5th day of August, 1930.

WERNER ESPE.